(12) United States Patent
Mendez (10) Patent No.: US 8,489,704 B1
(45) Date of Patent: Jul. 16, 2013

(54) METHOD AND APPARATUS FOR PROVIDING INFORMATION ON A REMOTE VIEWING SESSION

(75) Inventor: Debby Mendez, Arlington, MA (US)

(73) Assignee: Glance Networks, Inc., Arlington, MA (US)

( * ) Notice: Subject to any disclaimer, the term of this patent is extended or adjusted under 35 U.S.C. 154(b) by 216 days.

(21) Appl. No.: 12/898,652

(22) Filed: Oct. 5, 2010

Related U.S. Application Data

(60) Provisional application No. 61/248,644, filed on Oct. 5, 2009.

(51) Int. Cl.
*G06F 15/16* (2006.01)
(52) U.S. Cl.
USPC .......................... 709/217; 709/204; 709/205
(58) Field of Classification Search
USPC ......................................... 709/204, 205, 217
See application file for complete search history.

(56) References Cited

U.S. PATENT DOCUMENTS

| 7,847,755 B1 * | 12/2010 | Hardebeck et al. ........... 709/231 |
| 2008/0098067 A1 * | 4/2008 | O'Sullivan et al. ........... 709/204 |
| 2008/0235390 A1 * | 9/2008 | Noda et al. .................... 709/232 |

* cited by examiner

*Primary Examiner* — Jeffrey Pwu
*Assistant Examiner* — Jayesh Jhaveri
(74) *Attorney, Agent, or Firm* — Anderson Gorecki & Rouille, LLP (57) ABSTRACT

A Display generating data for transmission on a remote viewing session throttles the generation of updates so that updates are provided at a relatively constant rate during the remote viewing session. Remote viewing software executing on the Display estimates when a transport layer of the display will complete sending a current update. If there is data to be sent, the remote viewing software will start to process a next subsequent update prior to the time that the remote viewing software estimates that the transport layer will finish sending the current update, so that the remote viewing software is able to provide a pipeline of data just in time to the transport layer to keep the transport layer active in transmitting data on the remote viewing session.

18 Claims, 5 Drawing Sheets

METHOD AND APPARATUS FOR PROVIDING INFORMATION ON A REMOTE VIEWING SESSION

CROSS REFERENCE TO RELATED APPLICATIONS

This Application claims priority to U.S. Provisional Patent Application No. 61/248,644, filed Oct. 5, 2009, entitled Performance Improvements for Remote Viewing Systems, the content of which is hereby incorporated herein by reference.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND

1. Field

The field relates to visual information systems and, more particularly, to a method and apparatus for providing information on a remote viewing session.

2. Description of the Related Art

Telephones enable people to communicate verbally, but do not enable people to exchange visual information with each other. Historically, when visual information such as a PowerPoint (™ Microsoft Corporation) presentation or a document was to be referenced during a telephone call, the visual information would be transmitted, e.g. emailed, before-hand so that the participants could each have the document locally displayed on their computer during the telephone conference.

Remote Viewing Software has now developed which changes this paradigm, by allowing multiple people to remotely see what is being displayed on one person's computer. They way this type of software generally works, is that a person who wishes to allow other people to view what is being displayed on their monitor will launch the Remote Viewing Software on their local machine. This will start a remote viewing session which other Viewers can join. When a Viewer joins the remote viewing session, a window will open on the remote Viewer's monitor which shows the content that is being shown on the Display's monitor. Software that allows remote viewers to see a Display over a computer network will be referred to as "Remote Viewing Software" (RVS).

Figure 1:
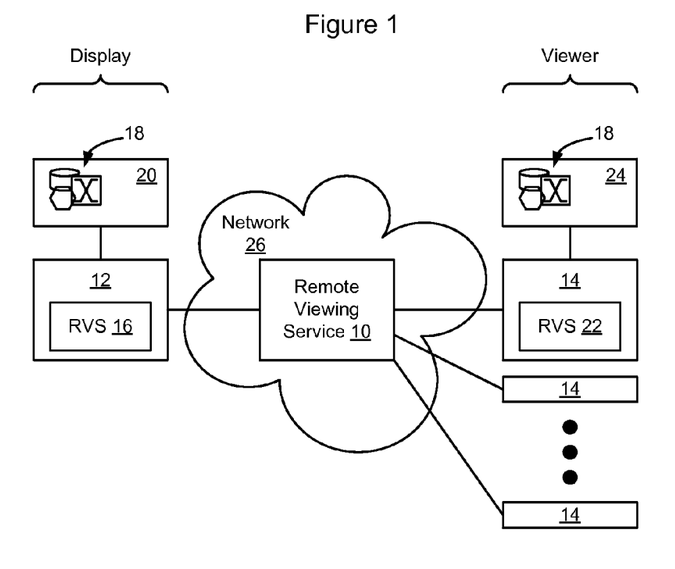
FIG. 1 is a functional block diagram illustrating the participants to a remote viewing session.

FIG. 1 illustrates an example of a way in which information being generated and shown on a monitor of one computer may be viewed remotely. As used herein, the term "Display" will refer to the computer that is sharing information with others. The term "Viewer" will refer to the computers that are receiving information remotely. FIG. 1 shows an example remote viewing system in which a remote viewing service 10 interconnects a Display 12 with one or more Viewers 14. The display 12 includes a remote viewing software client 16 to capture, encode, and transmit information 18 being shown on a monitor 20 associated with Display 12. Each of the Viewers 14 includes a remote viewing software client 22 to receive and decode information 18 which is then shown on monitor 24 of the Viewer 14. The remote viewing software client 22 at the Viewers may be the same as the Display client 16 or a more limited version designed to primarily allow data to be displayed and not configured to capture and transmit data.

In the system shown in FIG. 1, the Display 12 sends data to the remote viewing service 10, which relays the data to the Viewers. This allows the Viewers to have a synchronized view of what is shown on the Display's monitor, so that the participants to the remote viewing session can reference a common visual presentation (information 18).

It is possible for the Display to send data to the server faster than the server can send it to the Viewers. This may occur in instances, for example, where one or more of the Viewers is on a relatively low bandwidth network connection. In this situation, at least some of the data sent by the Display will not be able to be sent to the Viewer. Thus, there is no advantage in having the Display send data faster than the fastest Viewer can receive it. Accordingly, a handshake mechanism has been developed in which the Display will provide updates to the Remote Viewing Service upon request.

Figure 2:
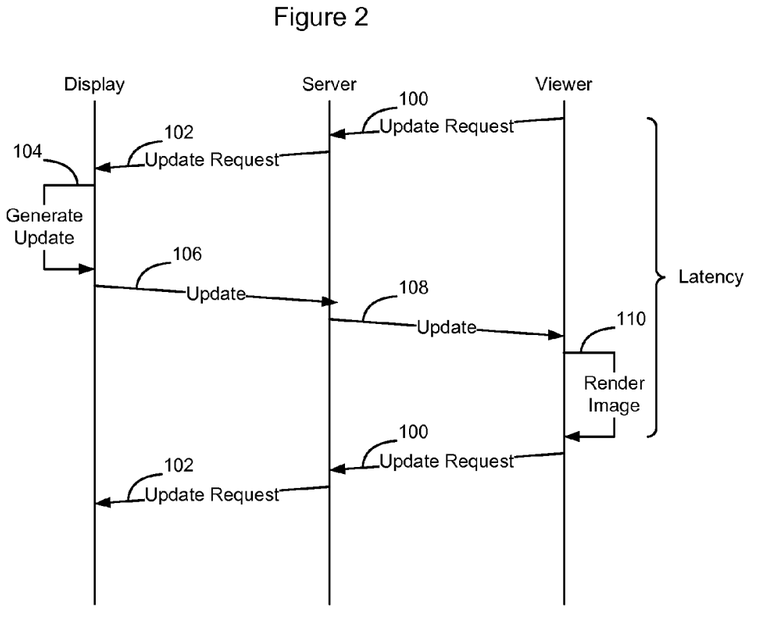
FIG. 2 shows a signaling view of a handshake process that may be used by a Viewer to control the rate at which the Display generates updates during a remote viewing session.

FIG. 2 shows one way in which data may be transmitted between a Display and Viewer. In the embodiment shown in FIG. 2, when a Viewer is ready for data, it sends an update request to the server (100). The server forwards the update request to the display (102). The display captures changed screen data and compresses the data to create an update (104). The Display then sends update messages to the server (106). The server forward the update messages to the viewer (108). The viewer receives and renders the data on the screen (110). Once the viewer has received and rendered the complete update, it sends another update request to the server (100). This process iterates for each update to allow the Viewer to control the pace of receipt of updates. If there are multiple viewers in a session, the fastest viewer sets pace of updates and the server will locally handle selection and transmission of updates to the slower viewers. After the display has finished sending an update 106, the next update request received by the server from one of the viewers will cause the server to send a new update request (102) to the Display.

This handshake mechanism guarantees that the display never sends updates faster than the fastest viewer can process them. However, the handshake introduces latency into the update process, which degrades performance. As shown in FIG. 2, there is a finite amount of elapsed time from the time when the Viewer is ready for a new update until a new update starts to arrive. The specific amount of time it takes to begin forwarding a new update to the Viewer includes the network latency between the Viewer and server, the network latency between the server and the Display, the time it takes for the Display to create the update, the network latency between the Display and the server, the network latency between the server and Viewer, and the time it takes for the Viewer to render the update.

Thus, where a handshake mechanism of this nature is used, the Viewer that is setting the pace of updates will need to wait a finite amount of time after sending a request to start receiving updated information from the Display. Accordingly, it would be advantageous to improve this process of providing information on a remote viewing session.

SUMMARY

The following Summary and the attached Abstract set are provided herein to introduce some concepts discussed in the Detailed Description below. The Summary and Abstract sections are not comprehensive and are not intended to delineate the scope of protectable subject matter which is set forth by the claims presented below.

A method and apparatus for providing information on a remote viewing session enables a Display to throttle the generation of updates so that updates are provided at a relatively constant rate during the remote viewing session. In one embodiment, remote viewing software executing on the Display estimates when the transport layer at the display will complete sending a current update. The remote viewing software will start to process a next subsequent update prior to the time that the remote viewing software estimates that the transport layer will finish sending the current update, so that the remote viewing software is able to provide a pipeline of data just in time to the transport layer to keep the transport layer active in transmitting data on the remote viewing session.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of one or more embodiments of the invention. However, those skilled in the art will appreciate that the invention may be practiced without these specific details. In other instances, well-known methods, procedures, components, protocols, algorithms, and circuits have not been described in detail so as not to obscure the invention.

U.S. patent application Ser. No. 11/355,740, filed Feb. 16, 2006, entitled Method And Apparatus For The Transmission Of Changed Presenter Display Information, contains a detailed description of one way that a Display can select, encode, and transmit information as updates on a remote viewing session. This patent also includes information about how the remote viewing service may operate to enable Viewers to receive information during the remote viewing session. The content of U.S. patent application Ser. No. 11/355,740 is hereby incorporated herein by reference. Since the details associated with how the Display may generate an update are described in this previous patent application, those details are not included herein to avoid obfuscation of the description of the present invention. Although the system described in this related U.S. Patent Application is a preferred embodiment, other ways of generating updates and transmitting updates used by other remote viewing systems may advantageously be utilized in connection with the techniques described herein. Accordingly, although an embodiment will be described that is configured to work with the system described in U.S. patent application Ser. No. 11/355,740, the invention is not limited to use with that particular system.

In the following description it will be assumed that the Display is generating updates to be transmitted to Viewers. Display updates may be generated by comparing a new version of the information 18 being shown on the Display's screen with an earlier version of the information 18, and then transmitting commands that describe the changes to the information to remote viewing service or, optionally, directly to the Viewers.

In many scenarios, Viewers may be able to tolerate a small amount of delay in receiving updates from the Display. For example, if the Display is running a PowerPoint presentation, the slides are likely to not change often and, hence, the Viewer can tolerate a small amount of delay in receiving an updated slide from the Display. However, if the Display uses several successive updates to transmit changes to a given screen area, the latency associated with having the viewer request updates from the Display may cause the changes to the screen area to be transmitted piece-by-piece, which can degrade the quality of the presentation to the Viewer. Likewise, in other situations, such as in connection with animations and video, the latency introduced in connection with instructing the Display to provide updates only when requested by the Viewer may reduce frame rate, increase delay between sound and video and otherwise reduce the Viewer's quality of experience.

According to an embodiment of the invention, to reduce the latency in the update process, the display will no longer wait for an update request before sending data. Rather, the display implements a throttling process to estimate when additional data will be needed. This throttling enables the Display to provide a constant stream of data to the server without introducing the latency associated with waiting to provide data until requested by at least one of the viewers.

A side benefit of this modification is that the Display becomes completely decoupled from the Viewers, and will keep the server up to date with Display data even when there are no Viewers in the session. As soon as a Display starts a session, it sends a full update followed by continuous incremental updates, regardless of Viewer state. This means that when the first Viewer joins a session, up to date screen data is already available for it on the server.

In one embodiment, a Remote Viewing Client on the display computer generates updates associated with changes to the information being shown on the display monitor and passes the updates to a transport layer on the display computer. The transport layer is then responsible for formatting and packetizing the data for transportation on the network. However, if there are continuous screen changes, it is possible for the Remote Viewing Client to generate update messages faster than the transport layer can send data on the network. In this instance, although the transport layer will buffer data to some extent, eventually the transport layer will block the display from pushing additional changes. Additionally, the display can end up filling the buffers in the transport buffers with data that sits around getting stale while the display is blocked from sending any fresh data. For example, where the Display is sending video, the Remote Viewing Client might fill the transport layer buffers with several frames of video that are only a few milliseconds apart, which may take the transport layer several seconds to send. On the viewer side, the frame rate will appear very uneven, i.e. jitter.

According to an embodiment, the display throttles the rate of generation of update data, so that as long as there are screen updates occurring, the network pipeline at the Display transport layer is kept filled with the most timely data possible. To maintain coherency of "frames", each update should capture all changes on the screen, and any throttling should occur between, not during, updates.

For example, if the Display is running a video, the display will capture and send an update (update N, which includes a set of update messages). Rather than immediately buffering another update to send, the display will predict when the end of update N will arrive at the server. The display will use this prediction to determine when to capture and send the next update (update N+1) such that the start of update N+1 arrives at the transport layer immediately after the transport layer finishes sending the end of update N. This allows the Display to provide the server with a constant stream of data without overrunning the transport layer buffers at the Display.

Stated differently, the capture of update N+1 should be at as late a moment in time as possible in order to keep the data at the server fresh, but soon enough to maintain a continuous stream of data going to the server. The delay of the screen capture will be referred to as throttling. For coherency, the display will only throttle after sending all changes associated with one view of the information being shown on the Display monitor at a particular point in time. As used herein, the term "update" is defined as a capture of all known changed areas of the information being shown on the Display monitor/screen at a particular point in time. A known changed area may become known because of receipt of a hint by the Remote Viewing Software indicating that a region may have changed, or may become known because of a cleanup scan or other processing of the screen to look for changes in the absence of a hint.

Figure 3A:
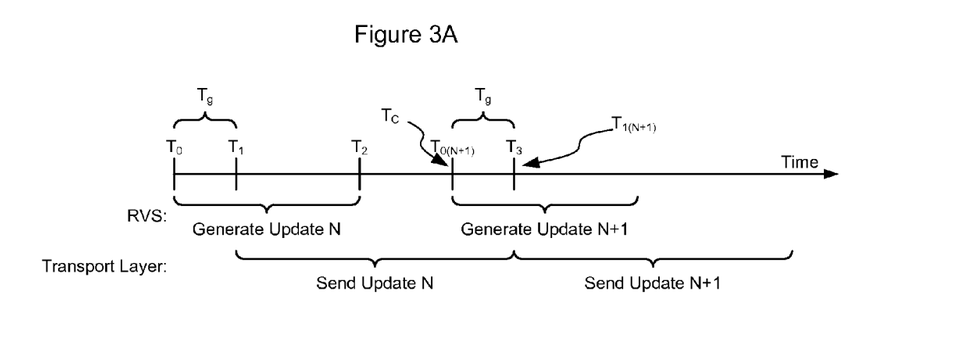
FIGS. 3A-3C are timelines showing a throttling process to be used by a Display to provide a relatively continuous stream of updates according to an embodiment of the invention.
Figure 3B:
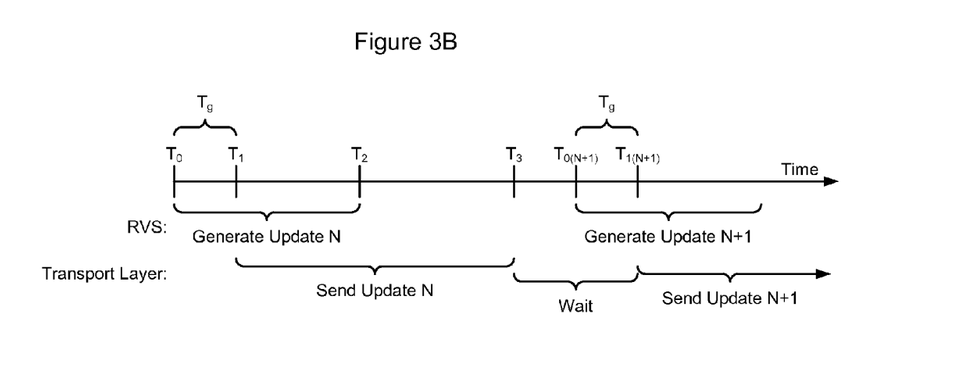
Figure 3C:
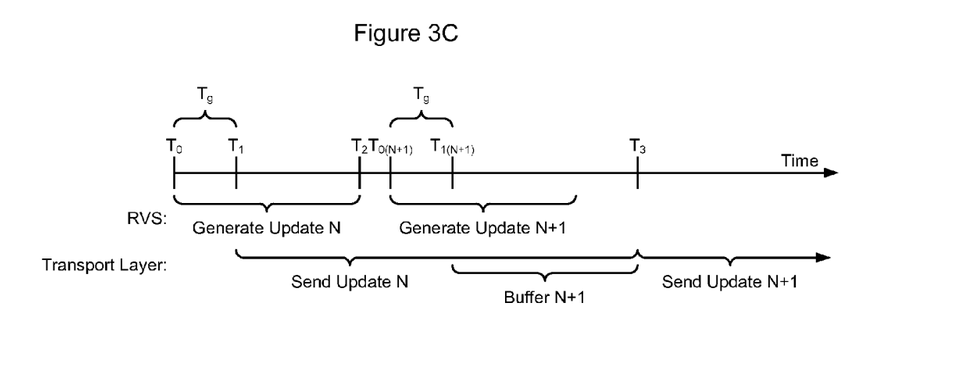

FIGS. 3A-3C show example timelines in which different amounts of throttling are used to control the timing of successive updates. In these Figs., FIG. 3A shows a scenario in which a proper amount of throttling has been applied to cause generation of a subsequent update (update N+1) to start at the correct time so that data may be continuously fed to the transport layer for transmission on the network. FIG. 3B shows a situation where the display throttled too much, so that data is not continuously fed to the transport layer for transmission on the network. Note, that the transport layer in FIG. 3B will send update N, wait for a period of time, and then start to send update N+1. This scenario may occur where the Display does not have data to send or where the display artificially delays generating data for update N+1 until a point which is too late in time and, hence, over-throttles generation of display updates. FIG. 3C shows a scenario in which insufficient throttling has taken place, such that the updates are generated faster than the transport layer can send them out on the network.

FIG. 3A shows an example timeline at the Display that will be used to show how the Display operates when implementing throttling. In FIG. 3A, at time $T_0$, the display will start capturing and compressing a portion of an update. Once a minimum amount of data has been captured and compressed, it will be passed to the transport layer for transmission. At this time, time $T_1$, the transport layer should have no data in its send buffer, and immediately starts transmitting the data. The remote viewing client will continue passing data to the transport layer while it processes the update. Generally, the transport layer will not be able to transmit data as fast as it is generated. The remote viewing software client will complete processing the update at time $T_2$. The transport layer will continue sending the data until all data in the update has been sent which, in FIG. 3, is time $T_3$.

FIG. 3B shows an example where the Display throttles too much, so that the remote viewing software client generates updates too slowly so that the transport layer is not provided with a continuous stream of data to transfer. Specifically, in FIG. 3B, the transport layer will finish sending update N and then wait for a period of time until data is again passed from the remote viewing software to the transport layer to be transmitted on the network.

FIG. 3C shows a scenario in which insufficient throttling has taken place, such that the updates are generated faster than the transport layer can send them out on the network. As shown in FIG. 3C, the remote viewing software will start generating a new update at $T_{0(N+1)}$ and start passing data for the new update to the transport layer at $T_{1(N+1)}$. However, the transport layer will still be sending data from the previous update until time $T_3$ and, hence, data will be buffered in the transport layer if insufficient throttling is applied.

To enable the remote viewing client to cause an uninterrupted stream of data to be output by the transport layer to the server, the remote viewing client is required to estimate when the transport layer will finish sending the previous update ($T_3$ in FIG. 3) and start generating new data just before the transport layer finishes sending that update. This estimation allows the remote viewing client to start generating data for update N+1 before the transport layer has finished sending the earlier update, but not too early, to enable the remote viewing software to start providing data to the transport layer just as the transport layer finishes sending the previous update. Looking at FIG. 3A, this occurs when $T_3$ of update N coincides with $T_{1(N+1)}$ for the next subsequent update N+1. When this occurs, the transport layer is able to be provided with a constant stream of data without overflowing the data buffers in the transport layer.

The remote viewing software client may also buffer data as it is generated to accumulate a minimum amount of data prior to forwarding any data to the transport layer so that the transport layer does not attempt to generate and transmit very small packets of data. As used herein, the quantity $T_g$ will be used to refer to the time between when the remote viewing client starts to generate data and when the remote viewing software client has sufficient data to start to send data to the transport layer ($T_g = T_1 - T_0$). According to an embodiment, the display keeps track of the amount of time it takes between starting to generate data $T_0$ and when the remote viewing software has generated enough data to start passing data to the transport layer $T_g$, the start time of the previous update $T_1$, and the total size S of the previous update N. Assuming that $T_g$ is relatively constant from one update to the next, the remote viewing client should start to capture the next update at time $T_C$ according to the following algorithm:

$$T_C = T_1 + S/B - T_g \quad \text{Equation 1:}$$

where $T_C$ is the time when the remote viewing software will start to capture the next subsequent update (Update N+1); $T_1$ is the time the transport layer started sending the current update; B is the display-server bandwidth; S is the size of the current update; and $T_g$ is the time between when the remote viewing client starts to generate data and when the transport layer starts to send the data.

In this equation, $T_1 + S/B$ provides the remote viewing client with an estimation of when the transport layer is likely to complete transmission of the current update which, in FIG. 3, is shown as time $T_3$. By subtracting $T_g$ from the estimation of time $T_3$, the remote viewing client can determine $T_C$ at which time it can start to generate data for the next subsequent update. This will allow the remote viewing client to generate and start to pass data to the transport layer for the next subsequent update in synchronization with the transport layer completing processing and transmission of the current update.

In some situations, the remote viewing software will look for screen changes when it is time to start capturing the next subsequent update ($T_C$) and determine that there is no new data to be transmitted. In this instance, the remote viewing software will sleep briefly and periodically query for hints to determine the time to generate the next subsequent update. Hence, where there is no new data to be transmitted, the remote viewing software will not need to throttle transmission of updates.

In order for the display to determine when to start generating updates, the Display must have a way to continuously measure available network bandwidth. In one embodiment, "ack" messages from the server are used to accomplish this. Specifically, in this embodiment, the server sends an "ack" message for the first and last messages in an update to allow the display to measure the network bandwidth. The ack messages contain a server timestamp in milliseconds that indicates when the update message was received by the server. It is assumed that server processing is constant and simply adds a fixed amount to the measured latency between display and server. Likewise, it is assumed that the network latency between the ack of the first message and the ack of the last message is relatively constant for a particular update. By comparing the time of arrival of the first and last messages for the update, and knowing the size of the update, the remote viewing client can determine the amount of bandwidth B available on the connection between the Display and the Server according to Equation 2.

$$B = S/(t_{ackend} - t_{ackstart}) \quad \text{Equation 2}$$

where B is the available bandwidth on the network, S is the size of the update, $t_{ackstart}$ is the server timestamp on the ack for the first message sent by the transport layer in the update, and $t_{ackend}$ is the timestamp for the last message sent by the transport layer in the update.

Usually for large updates, particularly with a fast graphics card or a mirror display driver in use, compressed screen data is generated several times faster than it can be sent, and between $T_1$ and $T_3$ in FIG. 3 there is an uninterrupted stream of data going from display to server. Large updates like these can be used to more accurately measure of bandwidth B. If the update size S is greater than some threshold (e.g. 10 kb), the remote viewing software client will use equation 2 to calculate the bandwidth B available on the network. Smaller updates may also be used, although as the updates get smaller the reliability of the bandwidth measurement may start to be affected more by other network conditions such as differences in network latency which have been assumed to be negligible when operating with larger sized updates.

Typically, the display will get a reasonable measure of bandwidth on its first update, which, as a full screen update, will exceed the threshold for bandwidth measurement. Bandwidth measurement is continually updated during a session any time large updates are sent, to enable changing network conditions to be detected. As changes in the available bandwidth are detected, the estimation process discussed above is adjusted by using the most recently computed value of B in Equation 1.

It is possible for errors to be made in the bandwidth measurement. For example, it is possible for conditions to exist under which the display fails to generate data faster than it can be sent. For example, if a slower machine, not using a mirror driver, is connected to a fast network, the transport layer may be able to transmit data faster than the remote viewing client is able to generate it. In this situation, there could be gaps in data transmission during the interval $T_1 \to T_2$ (FIG. 3) since during that time the client will be generating data for transmission and the transport layer will be transmitting the received data and then waiting for the remote viewing client to provide it with the next piece of the update. In this case bandwidth can be underestimated since the server acknowledgments are based on an assumption that the transport layer was able to send a continuous stream of data.

The quantity B reflects the bandwidth measurement which was made during the last time a large update was sent. Since network conditions may change quickly, the actual bandwidth available for a particular update may be much different than what was available for a previous update. Hence, a margin of error for the bandwidth measurement must be expected and allowed for.

There are several factors which can prevent throttling to work precisely as intended. For example, as noted above, the bandwidth measurement may be expected to have some error. Likewise, in reality, the amount of time it takes between when the remote viewing client starts to process an update and when the transport layer starts to send the data ($T_g$) is likely to vary somewhat depending on the particular type of update and whether other applications on the Display are also using the transport layer. For example, $T_g$ will be relatively constant in some display side scenarios (e.g. showing a video) but not all. Likewise, network conditions (most commonly bandwidth) can simply vary during a session.

Accordingly, in one embodiment, the acknowledgment messages are used to provide feedback to the throttling logic to detect and handle errors. There are two common scenarios that may occur: (1) the display is throttling too little, in which data will start to accumulate in the transport layer; and (2) the display is throttling too much. If the Display is throttling too much, data will not back up on the network, but performance of the video quality on the remote viewing session will be affected from having artificially lowered the amount of data that the Display is able to provide to viewers over the session.

If the display is throttling data insufficiently (sending too fast), then data is buffered in the transport layer. Current updates will get stuck behind older buffered updates. This situation can be detected by monitoring the time it takes for the first message in an update to be acknowledged by the server. If there is no excess buffering of data, the first message in each update should always take the same amount of time to reach the server, measuring from the time the message is sent by the remote viewing client to the time the message is acked on the server as measured by the server ack of the first message in the update. If there is excess buffering of data, it will take longer for the server to acknowledge the first message of a buffered update.

Figure 4A:
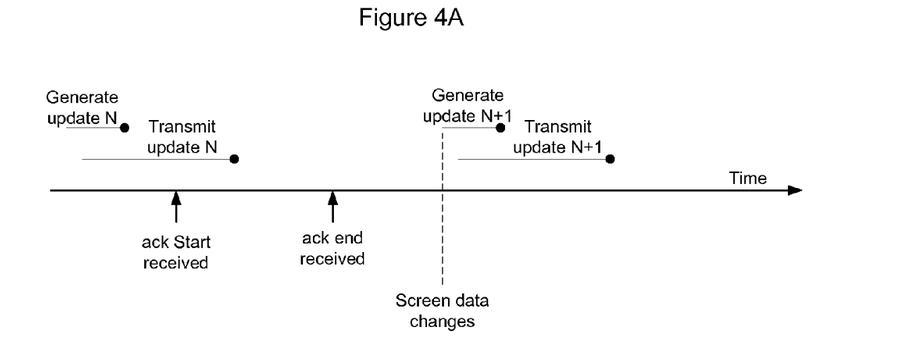
FIGS. 4A-4B illustrate update messages sent with and without data already in the transport pipeline.
Figure 4B:
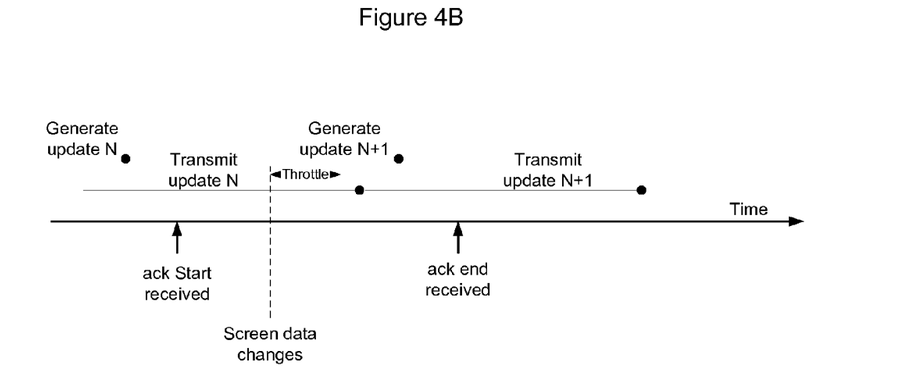

The first message in an update can either be a leading or a throttled message, depending on the status of the transport layer at the time when the remote viewing client starts processing a next subsequent update. FIGS. 4A and 4B show the difference between a leading message and a throttled message. In FIG. 4A, a message is generated and transmitted and all outstanding acknowledgements for the previous message are received before the remote viewing client starts to generate update N+1. Hence, in this case, the first message transmitted by the transport layer will be a "leading" message since acks for all previous messages have been received when the first message in update N+1 is transmitted.

FIG. 4B shows an example of a throttled message. As shown in FIG. 4B, when a screen change is detected not all acks have been received and the remote viewing software delays initiation of generation of an update to time the generation of the subsequent update with completion of transmission of the previous update by the transport layer.

A throttled message is a first message of an update that is generated by the remote viewing client where the remote viewing client starts processing an update before the transport layer has completed transmission of the previous update.

Since the transport layer is guaranteed not to be working on data from previous updates in connection with a leading message, an ack of a leading message will reflect the status of the network. Ideally, if throttling is working properly, an ack of a throttled message should be the same as an ack of a leading message since, if working properly, the throttled message should arrive at the transport layer just in time to be transmitted by the transport layer and, hence, should not encounter any buffering delays at the transport layer. If the ack of a throttled message takes longer than the ack of a leading message, it may be inferred that the throttled message was buffered in the transport layer and, hence, the remote viewing software is not throttling enough. Thus, monitoring acks of first messages may be used to determine whether the remote viewing software is throttling correctly.

In one embodiment, when the display receives an ack for the first message in an update, it measures how long the message took to get to the server by taking the difference ($t_{ackstart}-t_{sendstart}$), where $t_{sendstart}$ is the time at which the message was sent from the display. Since $t_{sendstart}$ is a client timestamp, and $t_{ackstart}$ is a server timestamp, this latency value is useful only as a relative measure. A baseline latency measurement $d=(t_{ackstart}-t_{sendstart})$ is taken for leading messages, which are guaranteed not to be stuck behind buffered data.

If the latency of a throttled message exceeds the baseline latency by more than some threshold (e.g. 200 ms) then data is not sufficiently throttled. One possible reason for under-throttling may be because of a drop in available bandwidth. If the remote viewing client detects that it is under-throttling, the display will wait for all messages to be acked to ensure that any backlog in the transport layer is cleared, and temporarily lower the threshold (update size limit) for measuring bandwidth. By lowering the size of the update required to measure bandwidth B, more bandwidth samples will be able to be collected to enable the Display to quickly get additional information about the available bandwidth on the network.

If a throttled update n has been throttled precisely the right amount, and if its send time was solely determined by the throttling logic and not delayed by lack of screen changes, then update N should arrive at the server immediately after update N−1 with little delay in between. In other words, $t_{ackstart}$ for update N should be within a few milliseconds of $t_{ackend}$ for the previous update N−1. If $t_{ackstart}$ for N is significantly greater than $t_{ackend}$ for N−1, then update n was throttled too much. This could be due to underestimating bandwidth, an increase in bandwidth, or longer than expected capture/compress time. Since the throttle will always allow a new update to be sent once all previous updates have been acked, there is an upper limit on the delay caused by over-throttling of $T_g+2*$latency. This worst case scenario is still an improvement over the former approach of waiting for an update request from the viewer. If over-throttling is detected by the Display, an error message may be generated as an alert.

Optionally, feedback from an over-throttling determination or under-throttling determination may be included into the equation used to select the capture start time. As noted above, the remote viewing client uses Equation 1 ($T_C=T_1+S/B-T_g$) to determine the time when it should start to capture the next update. Optionally, this equation may be modified as shown in Equation 3:

$$T_C=T_1+S/B-T_g+\delta \quad \text{Equation 3:}$$

where $\delta$ is a quantity of time calculated from the feedback associated with whether the system is over-throttling or under-throttling.

In particular embodiments, such as where TCP is being implemented in the transport layer as the protocol for display-server communication, the TCP send buffer must be large enough that it does not become the limiting factor in data transmission. It is well known that in order for TCP to utilize all available bandwidth, the TCP send buffer must be at least two times the bandwidth times the latency. In one embodiment, the display measures latency via a timing message sent when first connecting to the server. Then once the display is able to measure bandwidth, it adjusts the TCP send buffer accordingly.

Under high latency conditions or in high bandwidth conditions, the TCP send buffer may need to be quite large. In this situation, if there is a sudden drop in bandwidth, a large backlog of stale data may be stored in the send buffer at the transport layer. In this case the remote viewing client will detect that it is not throttling enough, and adjust how throttling is handled. The Display will then wait for receipt of all outstanding acks, at which point the send buffer is guaranteed to have cleared, and then resume generating updates. If the Display needs to close the session while waiting for the buffer to clear, the display will send a close message and wait for a short timeout period. If the display gets no response within the timeout period it will reset its socket connection, reconnect, and send a new close message.

The amount of time it takes to process particular messages may vary as well. For example, BitBlt messages can take much longer to process relative to their size (both on the server, with pruning, and on the viewer) as compared to messages containing pixel data. The BitBlt function is a Windows™ function that performs a bit-block transfer of color data corresponding to a rectangle of pixels from a specified source context into a destination context. Essentially, the BitBlt allows an area of the screen to move from one area to the other and allows that movement to be communicated on the session using a copy command rather than re-transmitting all of the pixel data in the new location. Processing time, not transmission time, is the limiting factor for how fast these messages can be handled. In one embodiment, accordingly, the remote viewing software does not throttle BitBlt updates according to the above algorithm. Instead, BitBlt messages are simply limited to a maximum of 2 per second. Other numbers of BitBlt messages may be transmitted as well depending on the particular implementation.

There are other situations where the Display may be able to transmit data faster than any of the Viewers may possibly use the data. For example, in a situation where the Display has a very high upload bandwidth available, continuous updates from the Display to the server can be wasteful of server resources. The Display therefore respects a bandwidth limit, set by the server during the initial exchange of messages when a session starts. If available bandwidth exceeds the limit, the Display applies additional throttling so that average bandwidth usage does not exceed the limit. Throttling still occurs only between updates and not during updates. Transmission rates can burst as high as permitted by the network while sending an update, but will be throttled sufficiently between updates so as to achieve an average bandwidth that is within the server specified limit.

Figure 5:
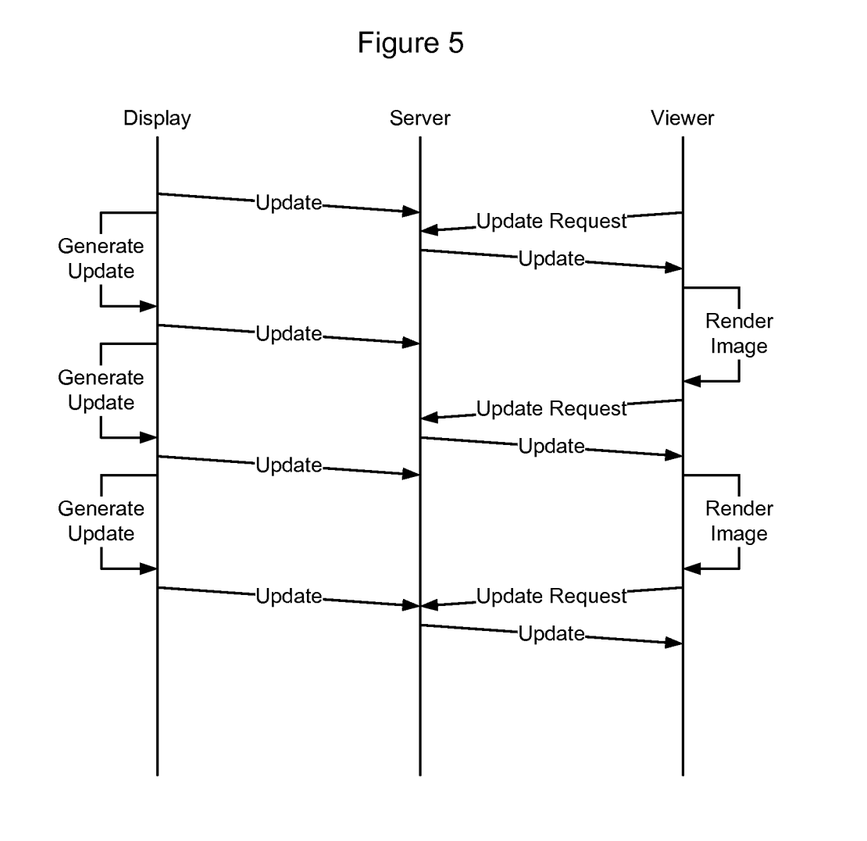
FIG. 5 is a signaling view of the throttling process in which generation of updates by the Display is decoupled from requests for updates by the Viewers according to an embodiment of the invention.

FIG. 5 shows an example exchange of information between the display and server, and between the server and viewer, which shows how the Display/server side is decoupled from the Viewer/server side on the remote viewing session. Specifically, as shown in FIG. 5, the Display throttles generation of updates and transmits updates to the Server within the bandwidth limit set by the Server and within the physical constraints associated with the transport layer and the available network bandwidth. The display generates and transmits updates without waiting for an update request from the server. If the display is idle for a period of time, the server may still send an update request to the display.

The viewer, by contrast, will tell the server when it is ready to receive an update. Hence, as shown in FIG. 5, when the Viewer is ready to receive an update it will send an update request to the server and the server will then send an update to the viewer. The viewer will render the image associated with the update and then send a new update request. The rate at which the viewer requests updates is unrelated to the rate at which the display sends updates. If the viewer requests updates faster than the display is sending them, the server will receive the viewer update request and wait until it has data to send to the viewer. As data becomes available the data will be sent to the viewer. If the viewer requests updates slower than the display is sending them, the updates will be buffered at the server for future transmission to the viewer. Since transmission of updates from the Display to the Server is decoupled from transmission of updates from the Server to the Viewers, it is possible for the Display to generate and transmit data to the Server faster than one or more of the Viewers can use the data. This may cause data to accumulate at the Server. Preferably, in this scenario, the Server is configured to implement a pruning process to eliminate obsolete data from the queue of data stored for transmission to the viewers to optimize transmission of relevant data to the viewers. One way of implementing a pruning process that may be utilized in connection with this is described in greater detail in U.S. patent application Ser. No. 12/061,011, Filed Apr. 2, 2008, entitled METHOD AND APPARATUS FOR SELECTING COMMANDS FOR TRANSMISSION FROM AN UPDATE QUEUE, the content of which is hereby incorporated herein by reference. Other ways of maintaining the queue at the server may be implemented as well.

Figure 6:
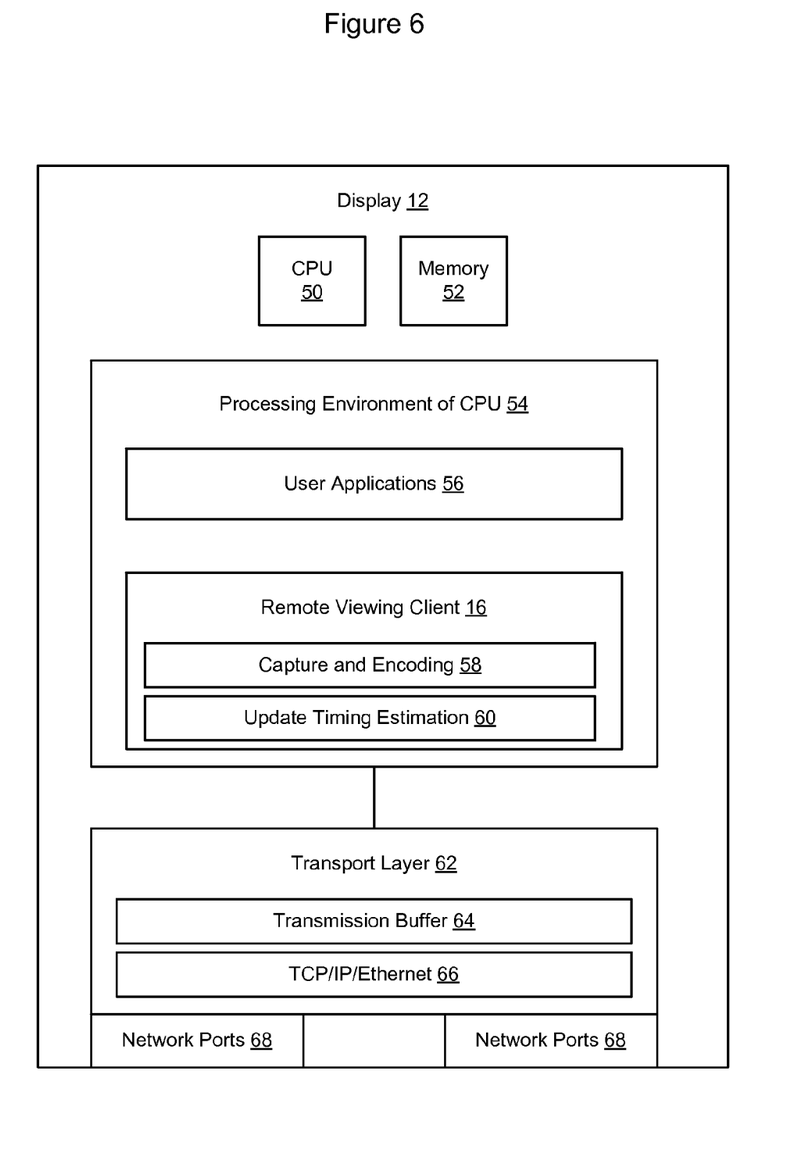
FIG. 6 is a functional block diagram of an example Display according to an embodiment of the invention.

FIG. 6 is a functional block diagram of an example display 12 that may be implemented according to an embodiment of the invention. As shown in FIG. 6, the display 12 includes a CPU 50 and memory 52. Memory 52 contains data and instructions which, when loaded into a processor environment 54 of the CPU 50, enable the display to implement the methods and functionality described in greater detail herein. For example, as shown in FIG. 6, the processing environment 54 of the CPU 50 may be configured to enable the Display to execute one or more user applications 56. Common user applications include presentation applications such as PowerPoint, word processing applications, computer aided design applications, and myriad other applications that may run on commonly available desktop computers.

The processing environment 54 further enables the display to implement remote viewing client 16. The remote viewing client, in one embodiment, includes capture and encoding functional components 58 that enable the remote viewing client to generate updates. As noted above, there are many ways of generating updates and the invention is not limited to the particular manner in which updates are generated. The remote viewing client further includes an update timing estimation module 60 that enables the Display to throttle generation of updates (calculate $T_C$) to keep the amount of data transmitted by the Display within the limit set by the server and according to the capabilities of the transport layer.

The Display 12 further includes a transport layer 62 which may be implemented as part of the processing environment 54 or offloaded to a separate network processing unit, e.g. on a line card or other network interface. The transport layer 62 includes a transmission buffer 64 to store data for transmission on the network as well as control logic 66 to enable the transmission buffer to format the data using one or more transportation protocols, such as TCP/IP/Ethernet so that the data may be sent over network ports 68 to be transported on the network to the server.

The methods described herein may be implemented as software configured to be executed in the control logic such as contained in a CPU of an electronic device such as a computer. In particular, the remote viewing software or portions of the remote viewing software may be implemented as a set of program instructions that are stored in a computer readable memory 52 within the computer or loaded onto the computer and executed on computer's microprocessor (CPU 50). However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

The functionality described herein may be implemented in a high level procedural or object-oriented programming language to communicate with a computer system. However, the programs can be implemented in assembly or machine language. The language may be a compiled or an interpreted language. Each computer program may be stored on an article of manufacture, such as a CD-ROM, hard disk, or magnetic diskette, that is readable by Display 50 to direct and control operation of the Display in the manner described above. The remote viewing software may also be implemented as a machine-readable storage medium, configured with one or more computer programs, where, upon execution, instructions in the computer programs cause the network processor to operate as described above.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

It also should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of providing information on a remote viewing session, the method comprising the steps of:
    generating updates by a Display, the step of generating updates comprising the steps of:

estimating, by a remote viewing software executing on a Display, a time of completion of sending of a current update by a transport layer of the Display; and starting to process, by the remote viewing software executing on the display, a next subsequent update prior to the estimated time of completion of sending of the current update by the transport layer; and transmitting updates by the Display to a Server, the step of transmitting updates comprising the steps of:

passing data for the next subsequent update to the transport layer; and transmitting, by the transport layer, a sequence of messages to transmit the data of the current update on a communication network;

wherein the remote viewing software starts processing the next subsequent update while the transport layer is still processing the current update, so that the remote viewing software is able to provide a pipeline of data just in time to the transport layer to keep the transport layer active in transmitting data on the remote viewing session; and wherein the Display will perform the steps of generating updates and transmitting updates to the Server regardless of whether any Viewers have joined the session to enable the Server to have a current version of Display Information, the Display Information being collected by the Server from the updates.

2. The method of claim 1, wherein the remote viewing software stores data in connection with the step of processing an update to accumulate approximately enough data to fill one packet prior to passing data for the update to the transport layer.

3. The method of claim 2, wherein a size of the packet is determined by a transmission protocol in use by the transport layer to transmit data on a communication network.

4. The method of claim 2, wherein the remote viewing software monitors how long it takes to generate approximately enough data to fill one packet.

5. The method of claim 4, wherein the step of starting to process the next subsequent update is initiated at the estimated time of completion of sending of the current update by the transport layer minus the monitored time it takes to generate approximately enough data to fill one packet.

6. The method of claim 1, wherein the step of starting to process is delayed to prevent the remote viewing software from generating data in excess of a bandwidth limit.

7. The method of claim 1, further comprising the step of iterating the steps of estimating, starting to process, passing data to the transport layer, and transmitting by the transport layer, for additional subsequent updates.

8. The method of claim 7, wherein each update is transmitted by the transport layer as a sequence of messages.

9. The method of claim 8, further comprising the step of receiving a start acknowledgement of the first message of each update, the start acknowledgment containing a start server timestamp indicating a time of receipt of the first message at the server.

10. The method of claim 9, further comprising the step of monitoring an amount of time between the step of passing data for each update to the transport layer and time of receipt of the start of the update at the server, as indicated by the start server timestamp in the start acknowledgment from the server.

11. The method of claim 10, further comprising the step of determining that the step of estimating the time of completion of sending of the current update is inaccurate if the amount of time between the step of passing data for each update to the transport layer and time of receipt of the start of the update at the server for each update is increasing.

12. The method of claim 1, further comprising the steps of receiving an end acknowledgement of a last message of the current update, the end acknowledgment containing a first server timestamp indicating a time of receipt of the last message of the current update at the server;

receiving a start acknowledgement of a first message of the next subsequent update, the start acknowledgment containing a second server timestamp indicating a time of receipt of the first message of the next subsequent update at the server;

determining a time difference between the first server timestamp and the second server timestamp; and determining that the estimation of time of completion of sending the first update was inaccurate if the time difference is greater than a threshold and the remote viewing software had sufficient data to generate the next subsequent update.

13. The method of claim 1, further comprising the step of estimating an amount of bandwidth on a network to be used to transmit the update by the transport layer.

14. The method of claim 13, wherein the step of estimating the time of completion comprises determining a start time for the current update, determining a size of the current update, dividing the size of the current update by the estimated amount of bandwidth to determine a transmission time, and adding the transmission time to the start time for the current update.

15. The method of claim 13, wherein the step of estimating the amount of bandwidth on the network comprises the steps of transmitting an update as a series of messages; receiving a start acknowledgement for a first of the series of messages, receiving an end acknowledgment for a last of the series of messages, and dividing a size of the update by an amount of time determined by comparing the start acknowledgment with the end acknowledgment.

16. A method of transmitting data on a remote viewing session, the method comprising the steps of:

generating updates by a Display to be viewed by one or more viewers on the remote viewing session;

transmitting updates by the display to a Server;

buffering the updates by the server to be transmitted to the one or more viewers;

receiving a request for an update from the one or more viewers;

in response to receiving the requests for the update transmitting, by the server to the Viewer, the update;

wherein transmission of updates from the Display to the Server is decoupled from transmission of updates from the Server to the Viewer;

wherein the Display generates updates by starting to process a next subsequent update prior to the estimated time of completion of transmission of the current update from the Display to the Server to provide a constant stream of update data to the Server; and wherein the Display will perform the steps of generating updates and transmitting updates to the Server regardless of whether any Viewers have joined the session to enable the Server to have a current version of Display Information, the Display Information being collected by the Server from the updates.

17. The method of claim 16, wherein a bandwidth of the constant stream of data is constrained according to a bandwidth limit negotiated between the Display and the Server.

18. The method of claim 16, further comprising the steps of joining the session by the Viewer, and downloading the current version of the Display Information by the Server to the Viewer when the Viewer joins the session without requesting additional information by the Server from the Display.

* * * * *